United States Patent
Moore

(10) Patent No.: US 8,462,235 B2
(45) Date of Patent: Jun. 11, 2013

(54) METHOD AND SYSTEM FOR X-DROOP CORRECTION IN SOLID STATE IMAGE SENSOR

(75) Inventor: John Kevin Moore, Edinburgh (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 347 days.

(21) Appl. No.: 12/916,967

(22) Filed: Nov. 1, 2010

(65) Prior Publication Data
US 2011/0128419 A1   Jun. 2, 2011

(30) Foreign Application Priority Data
Nov. 30, 2009   (GB) .................................... 0920930.5

(51) Int. Cl.
H04N 9/64 (2006.01)
H04N 5/228 (2006.01)
H04N 5/217 (2011.01)
H04N 3/14 (2006.01)
H04N 5/335 (2011.01)

(52) U.S. Cl.
USPC ........ 348/245; 348/222.1; 348/241; 348/243; 348/294; 348/296; 250/208.1

(58) Field of Classification Search
USPC ................ 348/207.99, 222.1, 241, 243–245, 348/294–324; 250/208.1
See application file for complete search history.

(56) References Cited

U.S. PATENT DOCUMENTS

| 7,133,073 | B1 | 11/2006 | Neter ........................... 348/272 |
| 7,304,670 | B1 | 12/2007 | Hussey et al. ................. 348/241 |
| 7,564,489 | B1* | 7/2009 | Oten et al. ..................... 348/241 |
| 2004/0169750 | A1* | 9/2004 | Miyahara et al. ............. 348/294 |
| 2004/0233305 | A1 | 11/2004 | Morishita ...................... 348/245 |
| 2005/0068431 | A1* | 3/2005 | Mori .............................. 348/241 |
| 2005/0104981 | A1 | 5/2005 | Findlater et al. .............. 348/241 |
| 2006/0232692 | A1 | 10/2006 | Takane ........................... 348/248 |
| 2006/0290628 | A1* | 12/2006 | Kondo ............................. 345/90 |
| 2007/0131846 | A1* | 6/2007 | Eskerud ...................... 250/208.1 |
| 2008/0012966 | A1* | 1/2008 | Beck et al. ..................... 348/245 |
| 2008/0129847 | A1* | 6/2008 | Kobayashi et al. ........... 348/243 |
| 2008/0291290 | A1* | 11/2008 | Sonoda et al. .............. 348/222.1 |
| 2009/0167913 | A1* | 7/2009 | Takenaka et al. ............. 348/301 |
| 2009/0244338 | A1* | 10/2009 | Kume ............................ 348/294 |
| 2011/0037882 | A1* | 2/2011 | Kukita et al. ................. 348/246 |

FOREIGN PATENT DOCUMENTS

| EP | 1475957 | 11/2004 |
| EP | 1615426 | 1/2006 |
| WO | 2009/017920 | 2/2009 |

* cited by examiner

*Primary Examiner* — Michael Osinski
(74) *Attorney, Agent, or Firm* — Allen, Dyer, Doppelt Milbrath & Gilchrist, P.A.

(57) ABSTRACT

A method and system is for limiting the x-droop effect in the digital image captured with solid state image sensors with a correction mechanism which instead of using only correction values from the same column to which the correction is applied, also takes the neighboring pixels into account to provide an averaged value to aid in the reduction of temporal and fixed noise contributions associated with the readout of a single pixel.

28 Claims, 7 Drawing Sheets

US 8,462,235 B2

METHOD AND SYSTEM FOR X-DROOP CORRECTION IN SOLID STATE IMAGE SENSOR

FIELD OF THE INVENTION

The present disclosure relates to solid state image sensors using CMOS technology, and, more particularly, to a method and system for correcting x-droop noise in solid state image sensors.

BACKGROUND OF THE INVENTION

In state of the art digital image sensors a known problem is the so called x-droop noise which is normally due to differences in column ground plane voltage, process variation or transient signal effects across the horizontal direction (i.e. the "x direction" which thus gives the name to this effect). Solid state image sensors normally include an array of pixels arranged in rows and columns which form a bi-dimensional image representation. An image is read out, row by row, via an array of Analog to Digital Converters (ADC). Every pixel in a column of data is read out by the same ADC.

As a result of process mismatch, the pixel data read out from a single column may have an associated offset with respect to its neighbors. Since this fixed offset will be apparent in every pixel read out by that ADC, i.e. a column of data, the resulting image artifact is commonly known as Vertical Fixed Pattern Noise (VFPN) or Fixed Pattern Noise (FPN). One approach which has been used in the known systems to adjust the resulting image is to counteract the effect of FPN with a cancellation mechanism.

U.S. Patent Application 2005/0104981 discloses a method for correcting column FPN in image sensors which include an output circuit for each column for reading pixel image signals via a pair of sample capacitors and a switching circuit operable based upon pixel switches for applying pixel voltages to the pair of sample capacitors. Each column has an optically masked pixel which does not contribute to the image but is used to estimate the column FPN. An image processing circuit records the column FPN for each column from the optically masked pixels, records the image signal from the sensor array of active pixels and subtracts the column FPN column-wise from the image signal.

The technique discussed in U.S. Patent Application 2005/0104981 will remove from the correction data, for a sensor employing a Sample and Hold readout methodology, the temporal noise contribution of the pixel, but it will not account for temporal noise associated with ADC circuitry. For a continuous time system, which performs an auto-zero operation on the black value and then maintains a continuous connection to the pixel to convert the signal component to a digital code, this methodology may not be useful: there is no CDSSIG (Correlated Double Sampling SIGnal) pulse to remove. Removing the TG pulse will allow the reset noise contribution to be removed but noise from the source follower (dominated by Random Telegraphic Signal (RTS) noise and 1/f noise) in addition to other noise, including noise from the ADC, will remain.

With the approach described in U.S. Patent Application 2005/0104981 some noise contributions are stored in the correction data, including temporal noise from the comparator and kTC noise: these noise contributions will be added to pixels from the visible array and will introduce new Vertical Fixed Pattern noise components. Also the approach described is specific to a sample and hold readout methodology, and cannot be fully applied to a continuous time architecture.

SUMMARY OF THE INVENTION

It is an object of the present disclosure to overcome at least some of the problems associated with the prior art.

According to one aspect of the present disclosure there is provided a method for limiting the x-droop effect in the digital image captured with solid state image sensors with a correction mechanism which instead of using only correction values from the same column to which the correction is applied, also takes the neighboring pixels into account to provide an averaged value to aid in the reduction of temporal and fixed noise contributions associated with the readout of a single pixel.

The method according to the present disclosure uses the average of a large number of samples to reduce the temporal noise contribution stored from the readout of information from the shielded pixels. The samples in this average are taken both in time, and across a number of columns in the x direction. These samples are then subtracted from the visible rows read out in an effort to cancel the droop visible in the final image.

The present disclosure offers a number of benefits. One of the advantages of the method according to a preferred embodiment of the present disclosure is that the x-droop effect is counteracted with a correction mechanism which limits the total number of line readings required.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
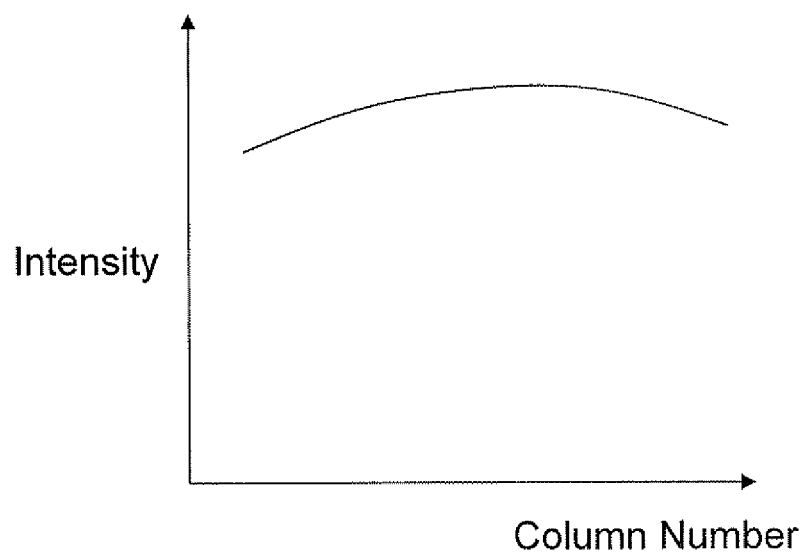
FIG. 1 is a schematic representation of an example of x-droop noise.

FIG. 1 is a schematic representation of a possible x-droop noise effect in a solid state image sensor. Such noise is due to various factors, such for example differences in column ground plane voltage, process variation or transient signal effects across the horizontal direction.

Figure 2:
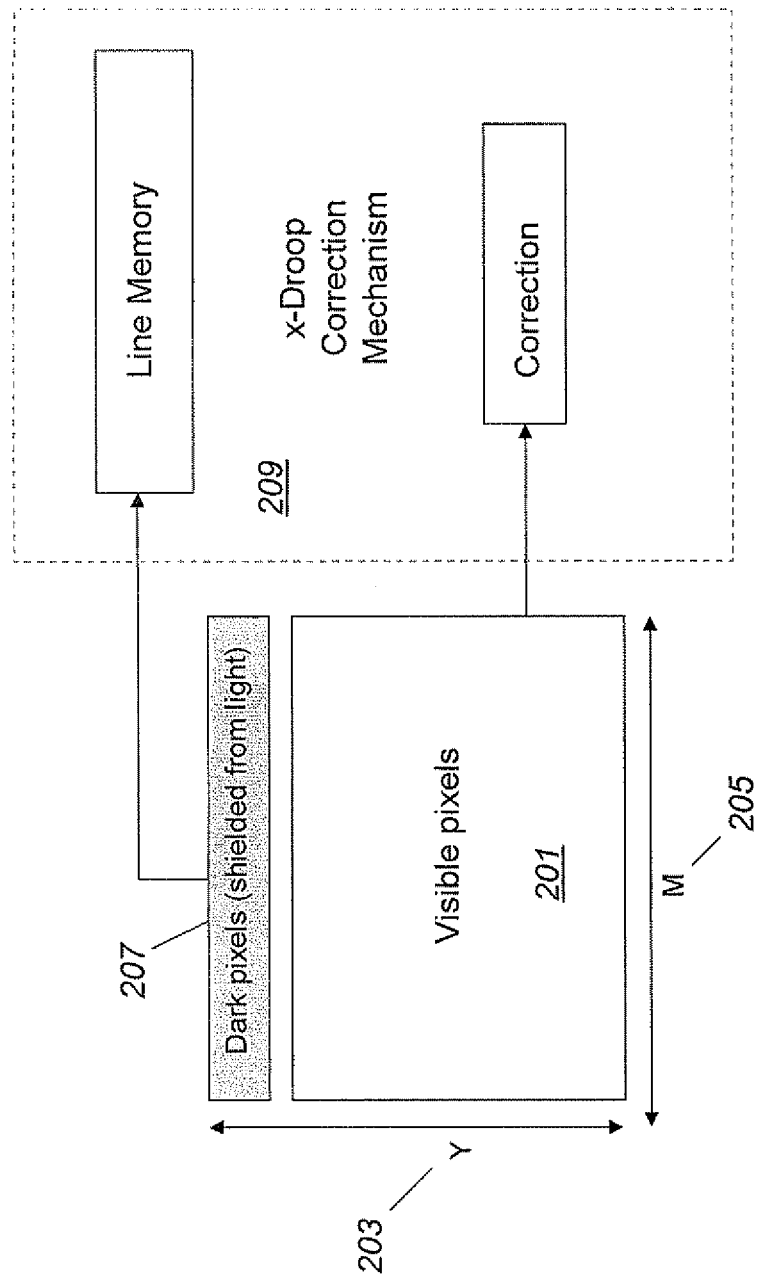
FIG. 2 is a schematic diagram of an image sensor according to a preferred embodiment of the present disclosure.

FIG. 2 shows a CMOS integrated image sensor, according to a preferred embodiment of the present disclosure, having an array of active pixels 201 arranged in Y rows 203 and M columns 205. To realize the correction mechanism, in a preferred embodiment of the present disclosure, the array of active pixels 201 includes at least one row of black (or dummy) pixels 207, which are identical to standard image pixels, but are not used to obtain image data. These black pixels are optically masked, i.e. they are shielded from incident radiation, so that output image signals obtained from the optically masked pixels represent substantially only the related column FPN and can be used to correct such noise. Data from the dark pixels area are supplied to an x-Droop Correction Mechanism 209 and are used to adjust the visible read out data obtained by the array 201.

Figure 3:
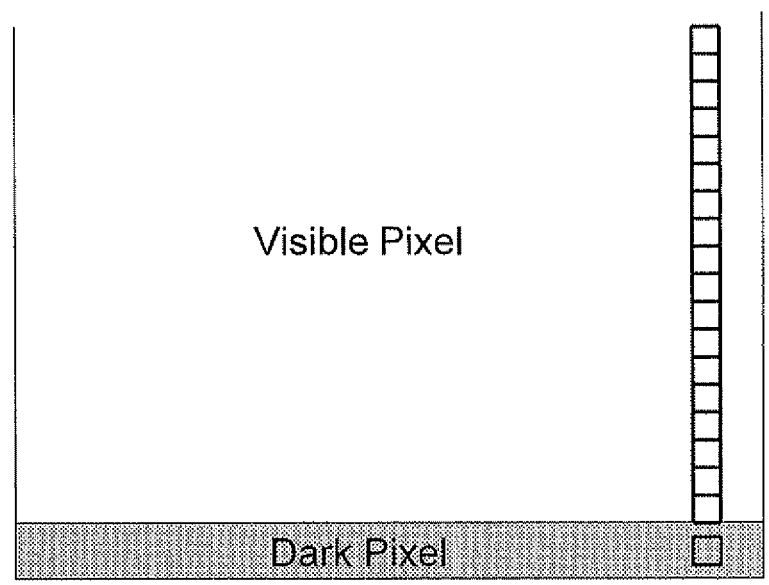
FIG. 3 is a schematic diagram showing the visible pixels and the optically masked pixels in the image sensor according to a preferred embodiment of the present disclosure.

FIG. 3 shows the example of one column of visible pixels with the corresponding dark pixel which represents the column FPN and droop contribution and should be subtracted from each pixel of the same column. The dark pixel area can include a plurality of rows, e.g. according to a preferred embodiment of the present disclosure 24 physical rows of dark pixels will be addressed multiple times so that the total number of row reads is around 250. For ease of description, FIG. 3 shows the simplified example of one column of visible pixels with the corresponding dark pixel which represents the column FPN and droop contribution which must be subtracted from each pixel of the same column. The array of active pixels of the system according to preferred embodiments of the present disclosure has been described in term of rows and columns, just for ease of description. Those skilled in the art will easily appreciate that the terms rows and columns are just used to indicate the two dimensions of the array of active pixels, but could of course be arranged in an inverse order so that the rows are columns and vice versa.

Figure 4A:
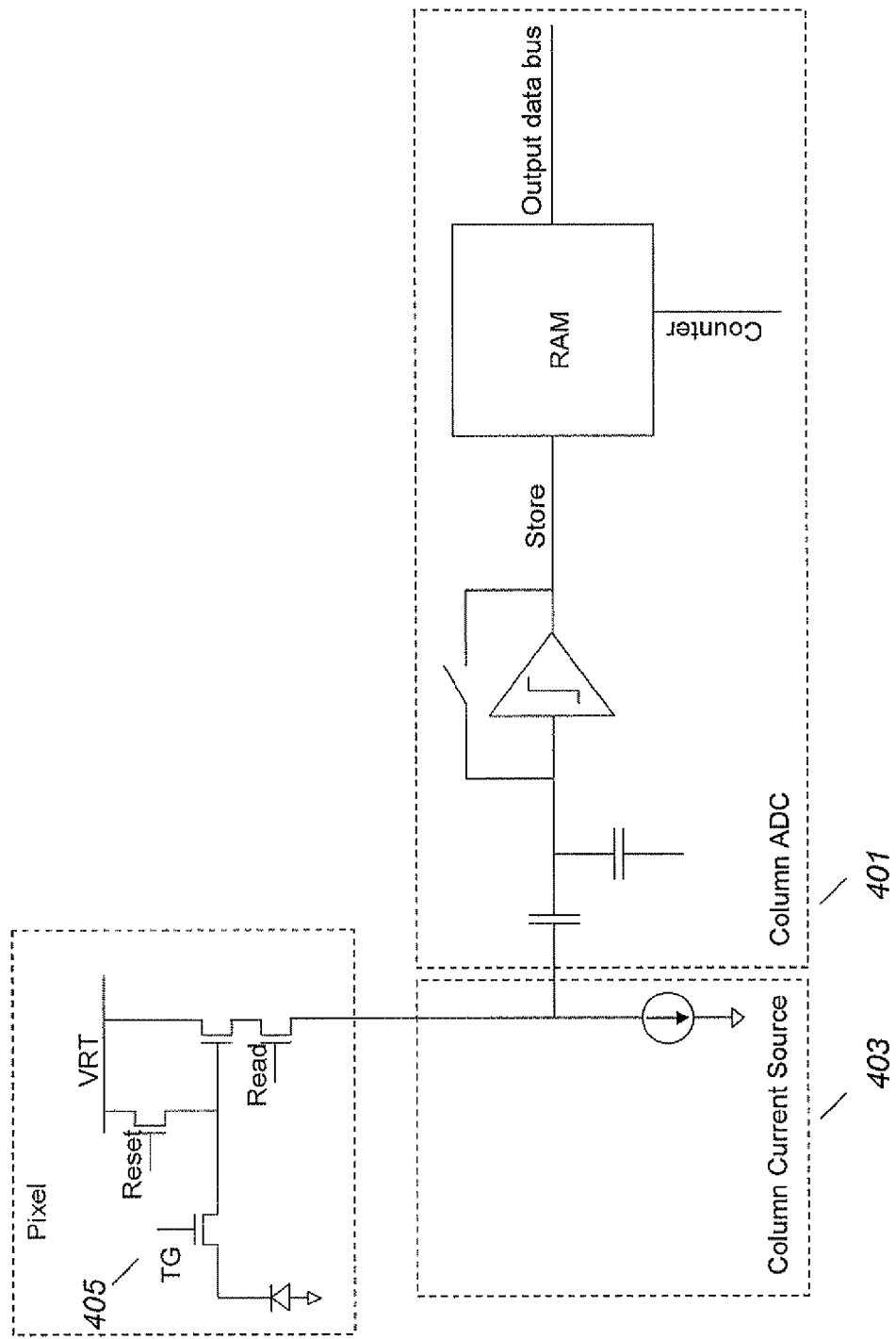
FIGS. 4a and 4b are schematic diagrams showing the circuit of an image sensor according to a preferred embodiment of the present disclosure.
Figure 4B:
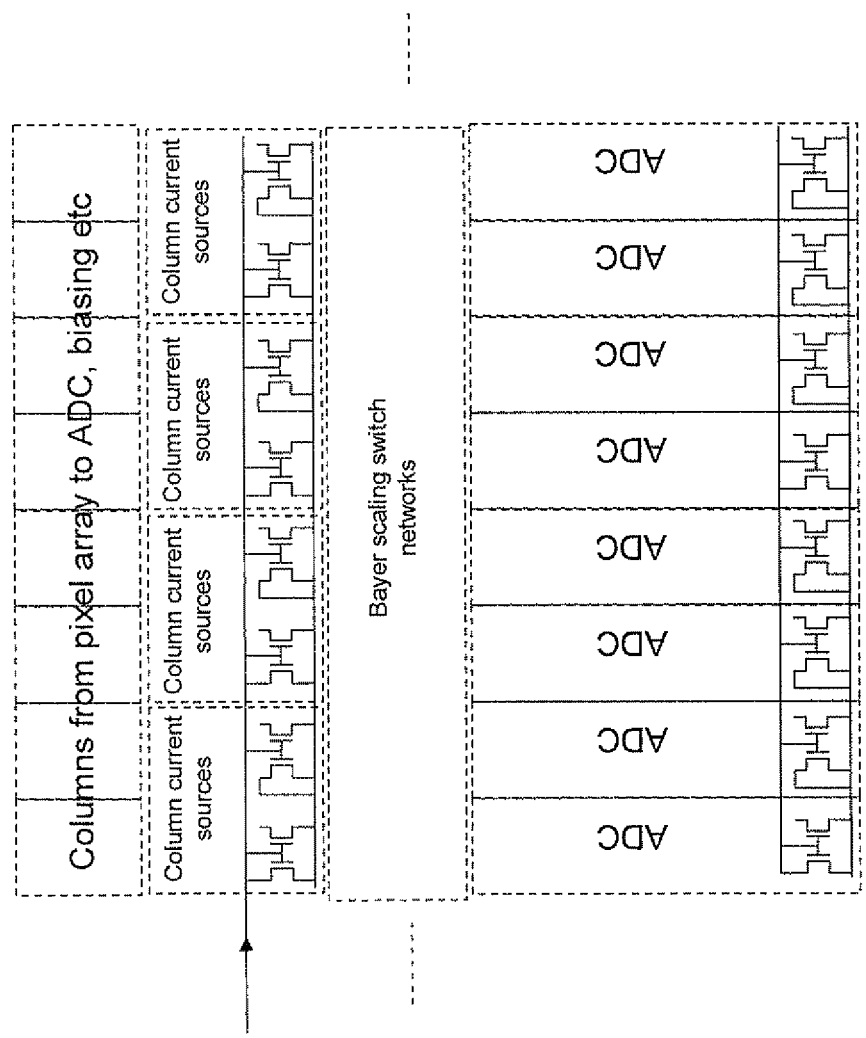

As shown in FIG. 4*a*, in a preferred embodiment of the present disclosure each column of the pixel array shares a common ADC, termed 'Column ADC' 401 and column current source 403. To optimize the layout of these components in terms of area and current consumption the column current source and comparator biasing networks may be laid out in repeating blocks across multiple columns as shown in FIG. 4*b*. Bayer Scaling switches cross several columns as this is a key requirement of their operation. Laying out the device in this manner is efficient, but it also opens up possibilities for periodic offset patterns in ADC output code values. This may be due to parasitic capacitances or resistances, or physical effects of column to column differences on transistor parameters. This periodic noise could be corrected with a Repeating FPN Correction mechanism as the one disclosed in co-pending application, filed on the same date by the same applicant and having the same inventor, with the title "Method and system for repeated fixed pattern noise correction".

Figure 5:
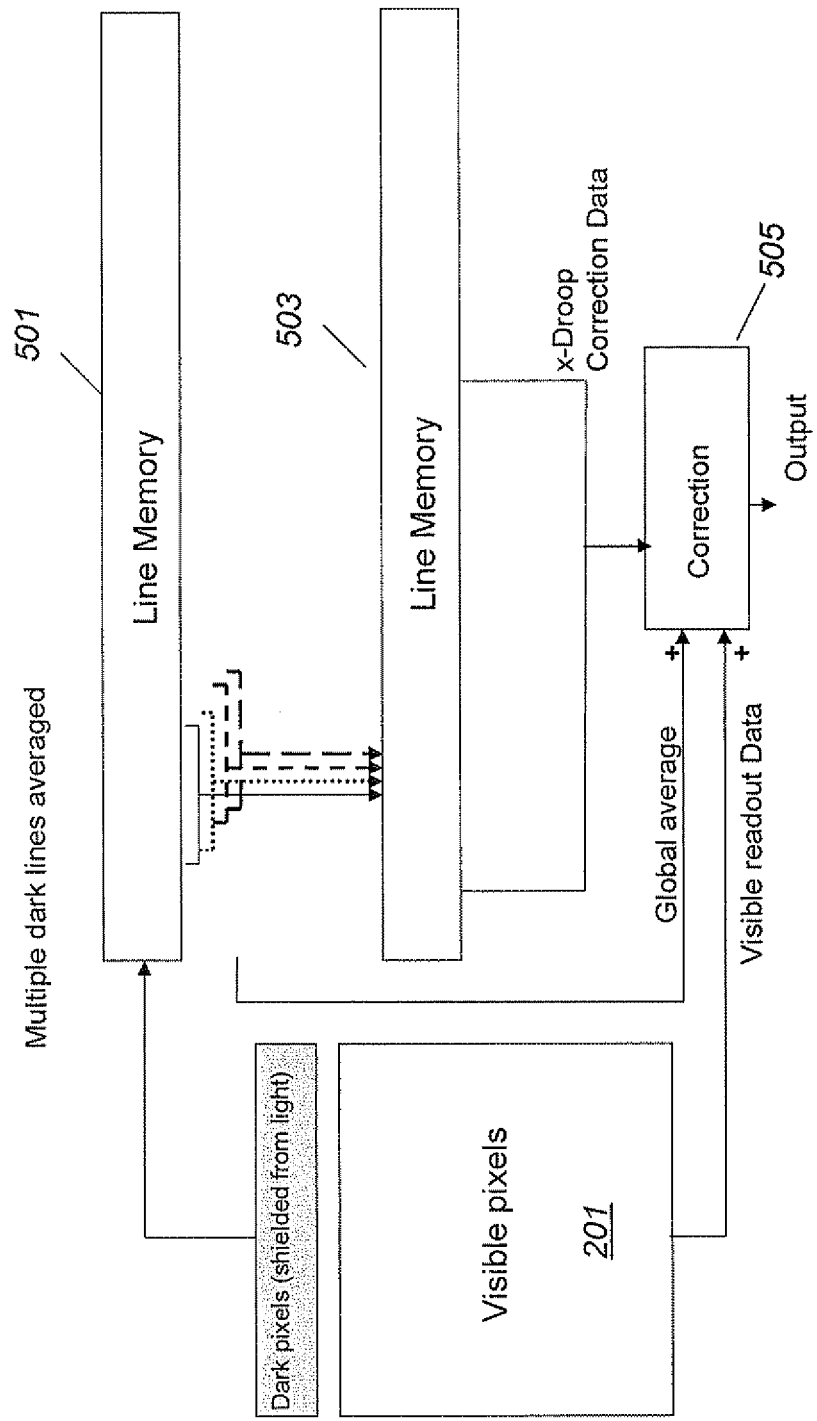
FIG. 5 is a schematic diagram showing the method of averaging FPN correction pixels with a number of neighbors pixels according to a preferred embodiment of the present disclosure.

According to a preferred embodiment of the present disclosure a line memory 501, as represented in FIG. 5 is used to contain average dark samples of the M columns of array of active pixels 201. In the present example, line memory 501 has the same size M as the rows of the array of active pixels (M is of course also the number of columns in the array 201); however other implementations are possible with the size of the line memory 501 being greater or smaller than the rows of the array of active pixels. Multiple reads of the optically masked line, or of several optically masked lines, are made and the results are digitally averaged into a line memory. It is worth noting that it may not be necessary to transfer charge from the photodiode itself when reading from the optically masked lines. This means there may be no requirement to pulse the Transfer Gate (TG) (see 405 in FIG. 4*a*).

Using this technique will remove some noise contributions from the values read out, including reset noise. It also removes the requirement for an integration period, allowing acceleration of the readout if only one optically masked row is used. The preferred embodiment includes flexibility to assess the benefits of photodiode transfer against having no photodiode transfer, since its omission may compromise droop correction information relating to signal timings, or voltage drops across the pixel array.

Figure 6:
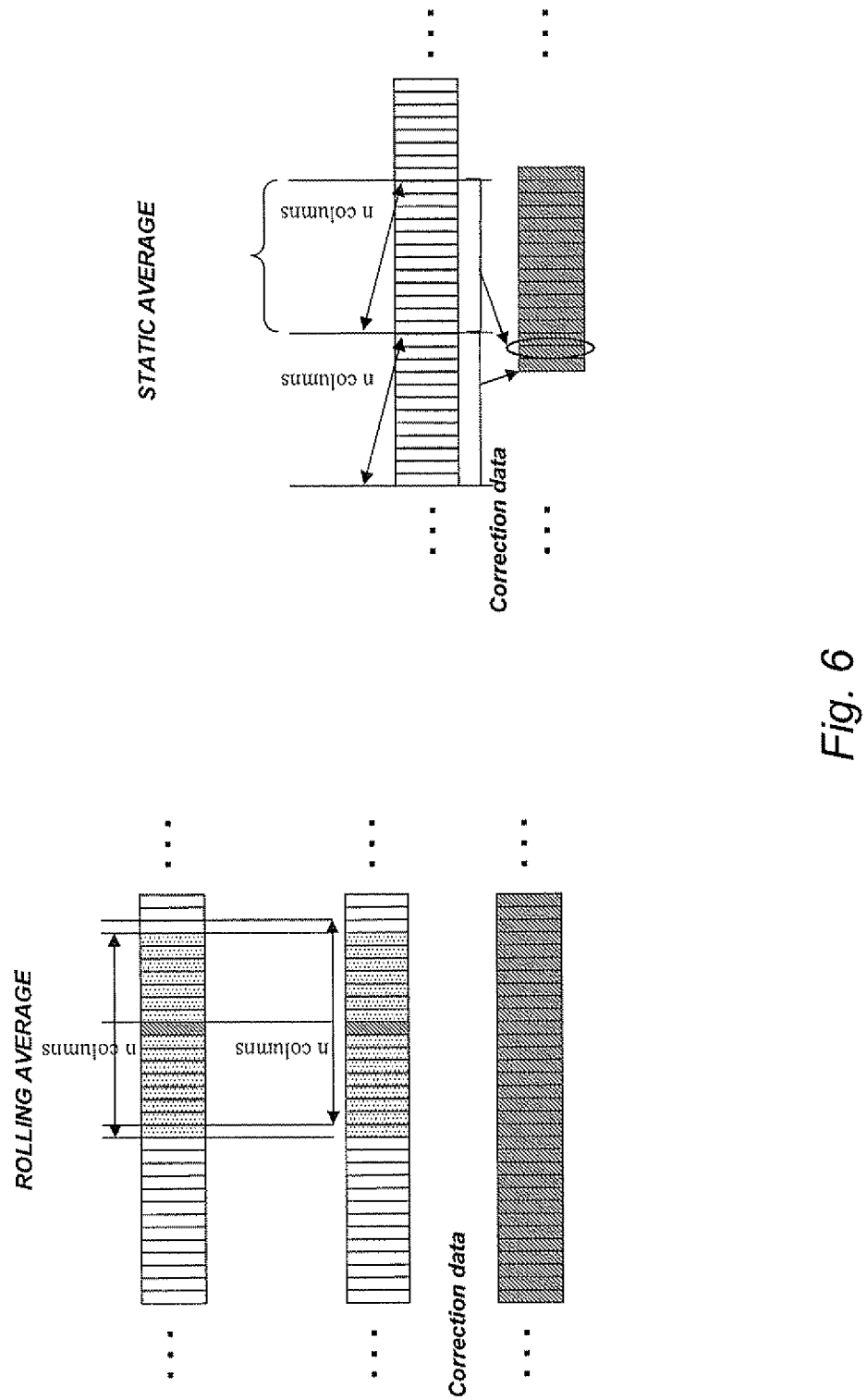
FIG. 6 are schematic diagrams showing an example of two different averaging techniques.

The averaged line memory samples are then processed according to a preferred embodiment of the present disclosure so that, for each pixel correction represented in the first M-size line memory 501 an adjusted value is calculated and copied to a second M-size line memory 503: according to a preferred embodiment of the present disclosure, each position in second line memory 503 will contain an average value based on the corresponding value of first line memory 501 and a number of neighbors positions. The number of neighbors used for calculating the average can vary according to several factors and it could be tuned also according to experimental results. In a preferred embodiment of the present disclosure such number is related to (e.g. a multiple of) the number of common readout repeating blocks across multiple columns mentioned above. The implementation of this averaging action can be done with several different techniques. FIG. 6 shows two examples of averaging technique.

The averaging operation in the x direction could be applied using a 'rolling average' methodology. This average would be applied over a width n, as illustrated in FIG. 6 so that the $1^{st}$ to n-th locations of memory M are averaged and stored in location n/2 of a new memory P. The $2^{nd}$ to the (n+1)-th locations of memory M would then be averaged and stored in location (1+n/2). This process would be repeated across the full array of memory M. There are numerous ways to generate samples for locations 1 to (n/2−1), i.e. beginning of the array, and for locations (M+1−n/2) to M, i.e. end of the array. Two options are: the use of a larger array so that M=P+n, or simply applying the same correction factor to locations 1 to (n/2−1) as is applied to location n/2 (same process should be applied to the last (n/2−1) positions). Clearly further options could involve compromises between the two options mentioned here. It is also worth noting that, since the number of memory locations is an integer, and n is likely to be an even number, it may be necessary to apply the average of terms 1 to n to term (n/2+/−) for this methodology to be functional. This rolling average gives a full line memory of data which is then used to correct the visible data read out on a column by column basis.

A static average is probably the simplest way to apply the average. Average samples 1 to n of M and store in location 1 of a memory Q, of width=M/n. Then average samples n+1 to 2n and store in location 2 of Q. Samples 2n+1 to 3n are averaged in location 3 of Q, and so on. When visible data is read out, location 1 of Q will be used to correct columns 1 to n. Location 2 will be used to correct columns n+1 to 2n, and so on. If M is not a multiple of n, then the final correction width (equal to n elsewhere) will be equal to n plus the remainder of M/n.

This averaging process reduces the x-droop noise contribution in the correction data. The content of memory 503 is then provided to a Correction module 505 and used to correct the image signals being received from the active pixel array 201. For each visible pixel value read out the x-Droop correction data contained in memory 503 is subtracted.

As an optional additional feature, to improve the resulting image and to maintain the image mean while subtracting the x-droop correction data, it is advisable to add a value which is an average of all the averaged line memory samples. For each visible pixel value read out, this value is added, while the x'-droop correction data is subtracted as explained above.

Figure 7:
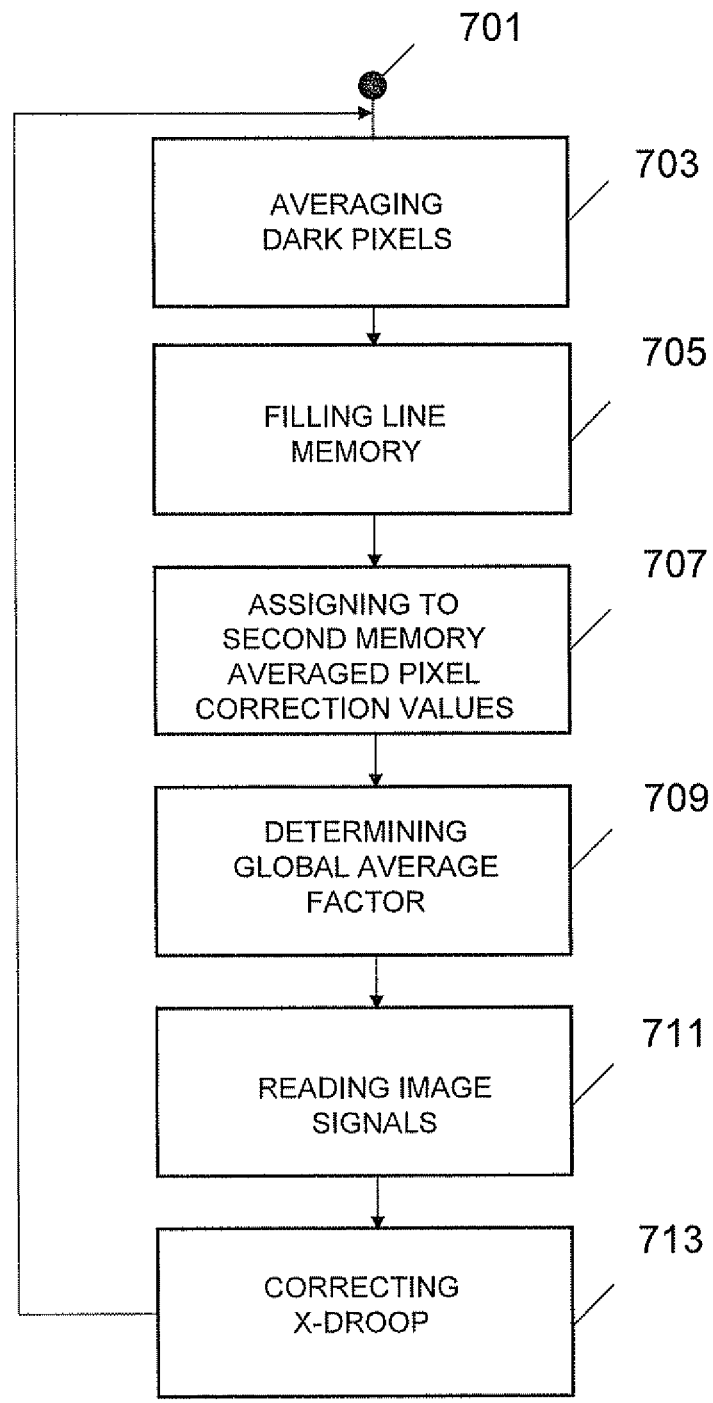
FIG. 7 is a flowchart illustrating method steps of a preferred embodiment of the present disclosure.

FIG. 7 schematically shows a diagram representing the method steps of a preferred embodiment of the present disclosure. The process starts at circle 701 and it is transferred to box 703 where optically masked pixels from the dark area are read and averaged. As mentioned above the dark pixel area could include one single row of optically masked pixels or a plurality of rows. In case they are several, as in the preferred embodiment, an averaging action is required. This activity could be done either by averaging the plurality of corresponding pixels in one position, or alternatively a plurality of reading of the same pixel to be sure the result is not affected by a temporary voltage problem or other contingent factors (this second averaging can be applied to the case where only one single row of dark pixel is available).

Yet another option is to combine the two techniques above. The M-size line memory is then filled with the averaged value at box 705. Moving to box 707 the data of first line memory are used to generate the averaged value of second line memory which will be used to correct the x-droop noise of the read image. According to a preferred embodiment, an averaging action is performed, so that, for each position $m_x$ (where $1<=x<=M$) in the first M-sized line memory, an average value according to the value of $m_x$ and the value of N neighbors positions in the first line memory is calculated and assigned to a corresponding position $m'_x$ in the second M-sized line memory. As explained above, the way the average is calculated can vary according to specific requirement; in the same way the size of the range of neighbors used to calculate the average can be customised. In a preferred embodiment of the present disclosure such number N is related to the number of columns of common readout repeating blocks.

An optional step is that of determining a global average factor (see box 709), calculated e.g. as a global average of all values of first M-sized line memory. Such Global Average factor can be added to corrected image signals so that the image mean is maintained. In a preferred embodiment of the present disclosure, in the calculation of such Global Average factor, those values exceeding a given threshold T are not considered. The image signals can be read from the image sensor (see box 711) and processed by the correction mechanism. Finally, at box 713 the image signals are corrected by subtracting the x-droop correction values and possibly adding the Global Average factor. The last two actions 711 and 713 in a preferred embodiment of the present disclosure are performed line by line and are repeated for each of the Y rows. The process can then restart with new samples taken from the optically masked area when e.g. a new frame of a moving image is received or a completely new image is to be processed.

It will be appreciated that alterations and modifications may be made to the above without departing from the scope of the disclosure. Naturally, to satisfy local and specific requirements, a person skilled in the art may apply to the approach described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed approach lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibres, wireless connections, networks, broadcast waves, and the like; for example, the medium may be of the electronic, magnetic, optical, electromagnetic, infrared, or semiconductor type.

In any case, the approach according to the present disclosure lends itself to be carried out with a hardware structure (for example, integrated in a chip of semiconductor material), or with a combination of software and hardware.

That which is claimed is:

1. A method for correcting x-droop noise in a digitally encoded image, captured with an image sensor comprising an array of active pixels arranged in rows and columns, at least one row comprising optically masked pixels which are shielded from incident radiation, so that output image signals obtained from each optically masked pixel substantially represent Fixed Pattern Noise (FPN) of the corresponding column, the method comprising:
   recording into a first M-sized line memory a value indicative of FPN values of the optically masked pixels;
   for each position $m_x$, where $1 \leq x \leq M$, in the first M-sized line memory, calculating an average value according to a value of $m_x$ and a value of N neighbor positions in the first M-sized line memory and assigning to a corresponding position $m'_x$ in a second M-sized line memory a value indicative of the calculated average value;
   reading pixel image signals from the array of active pixels; and
   adjusting the read pixel image signals based upon values in the second M-sized line memory.

2. The method of claim 1 wherein the columns of the array of active pixels are grouped in subsets of G columns having common blocks readout for reading the pixel image signals; and wherein the number N of neighboring pixel values used for averaging the value of each position $m_x$ of the first M-sized line memory is an integer multiple of G.

3. The method of claim 1 wherein adjusting the read pixel image signals includes subtracting the averaged values of the second M-sized line memory from read pixel image signals.

4. The method of claim 1 wherein calculating an average value according to the value of $m_x$ and the value of N neighbor positions includes calculating the average using a rolling average process.

5. The method of claim 1 wherein the value indicative of a column FPN recorded into the first M-sized line memory includes an average of all FPN values of the corresponding column of the at least one row of optically masked pixels.

6. The method of claim 1 wherein the value indicative of a column FPN recorded into the first M-sized line memory includes an average of multiple readings of the same FPN value of one optically masked pixel.

7. The method of claim 1 wherein adjusting the read pixel image signals includes adding to each pixel a global average factor calculated by averaging the values of the first M-sized line memory.

8. The method of claim 7 further including determining whether a value indicative of the FPN in the first M-sized line memory exceeds a threshold, and if so, excluding such value from the calculation of the global average factor.

9. A system for correcting x-droop noise in a digitally encoded image captured with an image sensor comprising an array of active pixels arranged in rows and columns, at least one row comprising optically masked pixels which are shielded from incident radiation, so that output image signals obtained from each optically masked pixel substantially represent Fixed Pattern Noise (FPN) of the corresponding column, the system comprising:
a first M-sized line memory configured to record a value indicative of FPN values of the optically masked pixels;
a second M-sized line memory configured to store a calculated average value, for each position $m_x$, where $1 \leq x \leq M$, in the first M-sized line memory, calculated according to a value of $m_x$ and a value of N neighbor positions in the first M-sized line memory, and assigned to a corresponding position $m'_x$ in the second M-sized line memory; and
a correction module configured to read pixel image signals from the array of active pixels, and adjust the read pixel image signals based upon values in the second M-sized line memory.

10. The system of claim 9 wherein the columns of the array of active pixels are grouped in subsets of G columns having common blocks readout for reading the pixel image signals and wherein the number N of neighboring pixel values used for averaging the value of each position $m_x$ of the first M-sized line memory is an integer multiple of G.

11. The system of claim 9 wherein the correction module is configured to adjust the read pixel image signals by subtracting the averaged values of the second M-sized line memory from read pixel image signals.

12. The system of claim 9 wherein the calculated average value is calculated according to the value of $m_x$ and the value of N neighbor positions including using a rolling average process.

13. The system of claim 9 wherein the value indicative of a column FPN recorded into the first M-sized line memory includes an average of all FPN values of the corresponding column of the at least one row of optically masked pixels.

14. The system of claim 9 wherein the value indicative of a column FPN recorded into the first M-sized line memory includes an average of multiple readings of the same FPN value of one optically masked pixel.

15. The system of claim 9 wherein the correction module is configured to adjust the read pixel image signals by adding to each pixel a global average factor calculated by averaging the values of the first M-sized line memory.

16. The system of claim 15 wherein the correction module is further configured to determine whether a value indicative of the FPN in the first M-sized line memory exceeds a threshold, and if so, excluding such value from the calculation of the global average factor.

17. A solid state image sensor comprising:
an array of active pixels arranged in rows and columns, at least one row comprising optically masked pixels which are shielded from incident radiation, so that output image signals obtained from each optically masked pixel substantially represent Fixed Pattern Noise (FPN) of the corresponding column;
a system for correcting x-droop noise in a digitally encoded image captured with the image sensor, the system comprising
a first M-sized line memory configured to record a value indicative of FPN values of the optically masked pixels,
a second M-sized line memory configured to store a calculated average value, for each position $m_x$, where $1 \leq x \leq M$, in the first M-sized line memory, calculated according to a value of $m_x$ and a value of N neighbor positions in the first M-sized line memory, and assigned to a corresponding position $m'_x$ in the second M-sized line memory, and
a correction module configured to read pixel image signals from the array of active pixels, and adjust the read pixel image signals based upon values in the second M-sized line memory.

18. The solid state image sensor of claim 17 wherein the columns of the array of active pixels are grouped in subsets of G columns having common blocks readout for reading the pixel image signals and wherein the number N of neighboring pixel values used for averaging the value of each position $m_x$ of the first M-sized line memory is an integer multiple of G.

19. The solid state image sensor of claim 17 wherein the correction module is configured to adjust the read pixel image signals by subtracting the averaged values of the second M-sized line memory from read pixel image signals.

20. The solid state image sensor of claim 17 wherein the calculated average value is calculated according to the value of $m_x$ and the value of N neighbor positions including using a rolling average process.

21. The solid state image sensor of claim 17 wherein the value indicative of a column FPN recorded into the first M-sized line memory includes an average of all FPN values of the corresponding column of the at least one row of optically masked pixels.

22. The solid state image sensor of claim 17 wherein the value indicative of a column FPN recorded into the first M-sized line memory includes an average of multiple readings of the same FPN value of one optically masked pixel.

23. The solid state image sensor of claim 17 wherein the correction module is configured to adjust the read pixel image signals by adding to each pixel a global average factor calculated by averaging the values of the first M-sized line memory.

24. The solid state image sensor of claim 23 wherein the correction module is further configured to determine whether a value indicative of the FPN in the first M-sized line memory exceeds a threshold, and if so, excluding such value from the calculation of the global average factor.

25. A digital image processing device including the solid state image sensor of claim 17.

26. A non-transitory computer readable medium including computer executable instructions for causing a computer to carry out a method of correcting x-droop noise in a digitally encoded image, captured with an image sensor comprising an array of active pixels arranged in rows and columns, at least one row comprising optically masked pixels which are shielded from incident radiation, so that output image signals obtained from each optically masked pixel substantially represent Fixed Pattern Noise (FPN) of the corresponding column, the method comprising:
recording into a first M-sized line memory a value indicative of FPN values of the optically masked pixels;
for each position $m_x$, where $1 \leq x \leq M$, in the first M-sized line memory, calculating an average value according to a value of $m_x$ and a value of N neighbor positions in the first M-sized line memory and assigning to a corresponding position $m'_x$ in a second M-sized line memory a value indicative of the calculated average value;
reading pixel image signals from the array of active pixels; and
adjusting the read pixel image signals based upon values in the second M-sized line memory.

27. The non-transitory computer readable medium of claim 26 wherein the columns of the array of active pixels are grouped in subsets of G columns having common blocks readout for reading the pixel image signals; and wherein the number N of neighboring pixel values used for averaging the value of each position $m_x$ of the first M-sized line memory is an integer multiple of G.

28. The non-transitory computer readable medium of claim 26 wherein adjusting the read pixel image signals includes subtracting the averaged values of the second M-sized line memory from read pixel image signals.

* * * * *